Oct. 20, 1925.

W. J. CITRON 1,558,145

FILM ATTACHMENT FOR STEREOPTICON PROJECTING MACHINES

Filed Oct. 31, 1923

Inventor
WILLIAM J. CITRON.
By Dewey, Strong,
Townsend & Loftus.
Attys.

Oct. 20, 1925.  
W. J. CITRON  
1,558,145  
FILM ATTACHMENT FOR STEREOPTICON PROJECTING MACHINES  
Filed Oct. 31, 1923    3 Sheets-Sheet 2
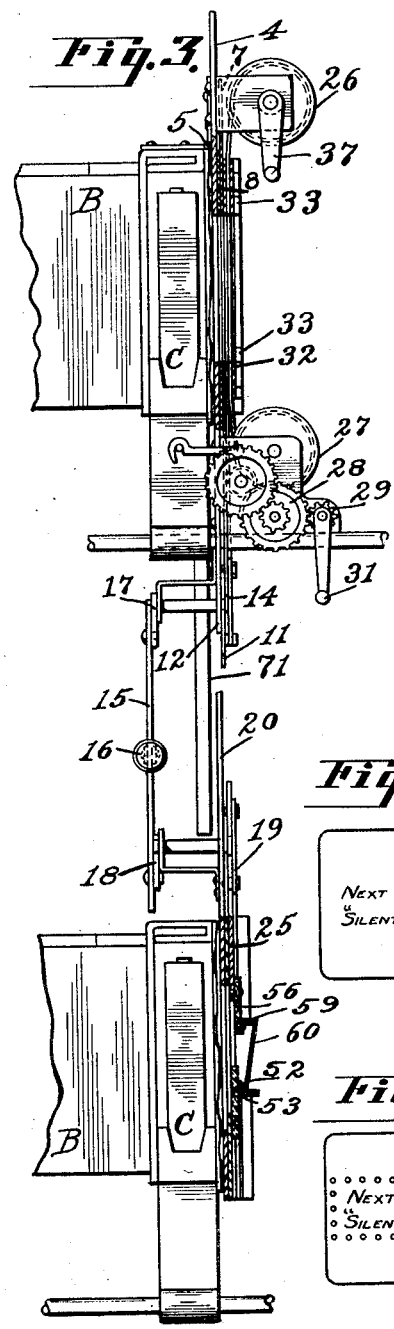
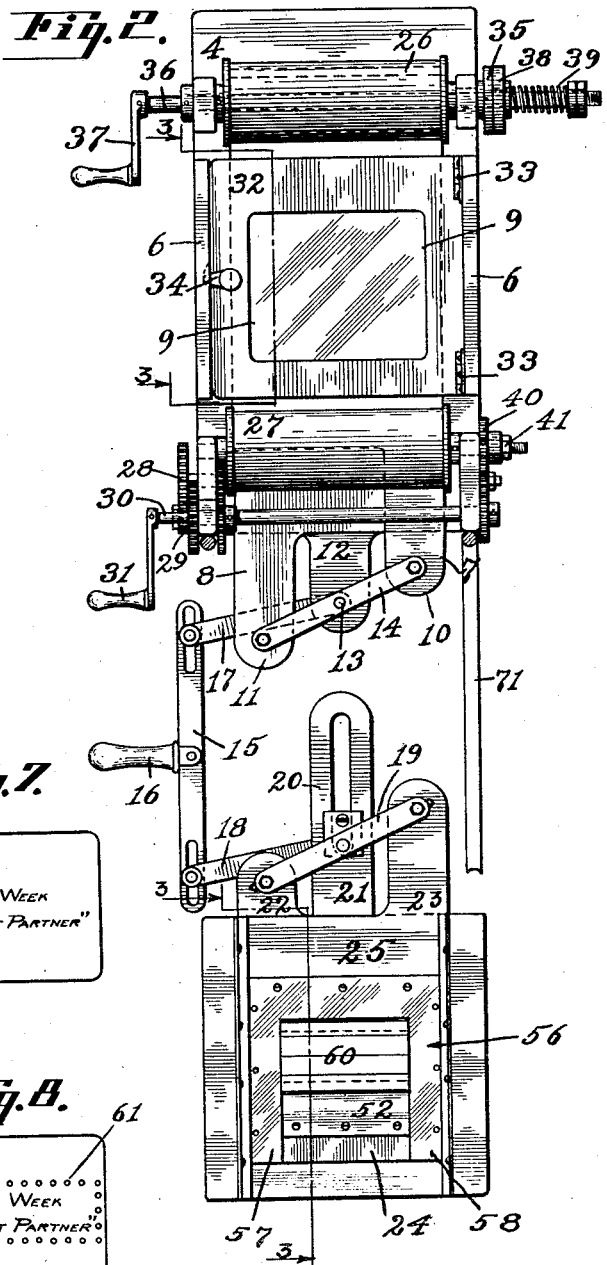
Inventor  
WILLIAM J. CITRON.  
By Dewey, Strong, Townsend & Loftus  
Attys.

Oct. 20, 1925.
W. J. CITRON
1,558,145
FILM ATTACHMENT FOR STEREOPTICON PROJECTING MACHINES
Filed Oct. 31, 1923   3 Sheets-Sheet 3
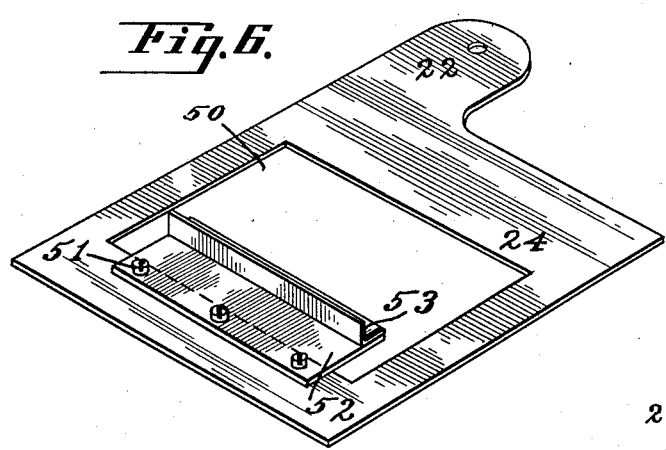
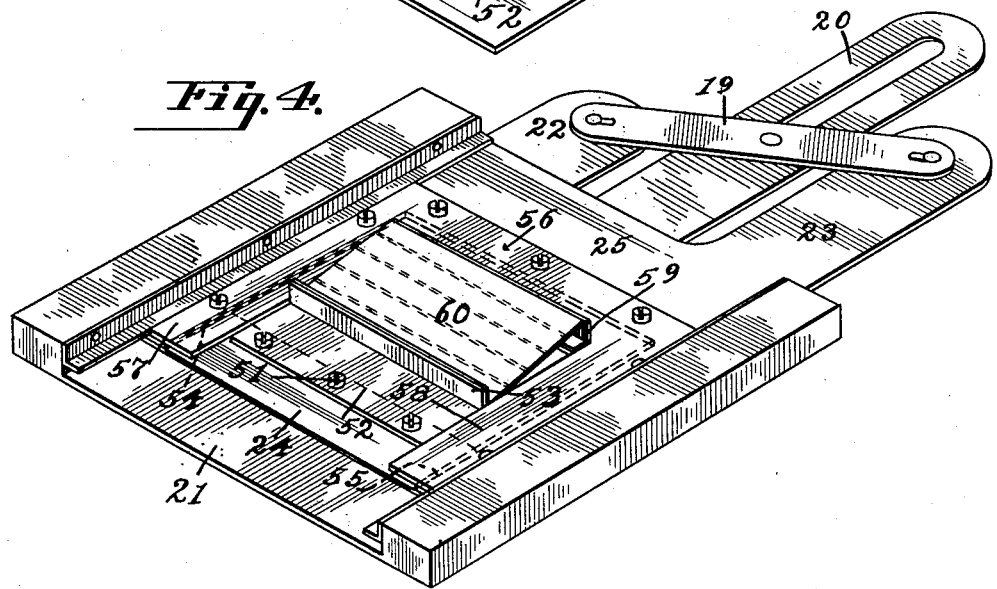
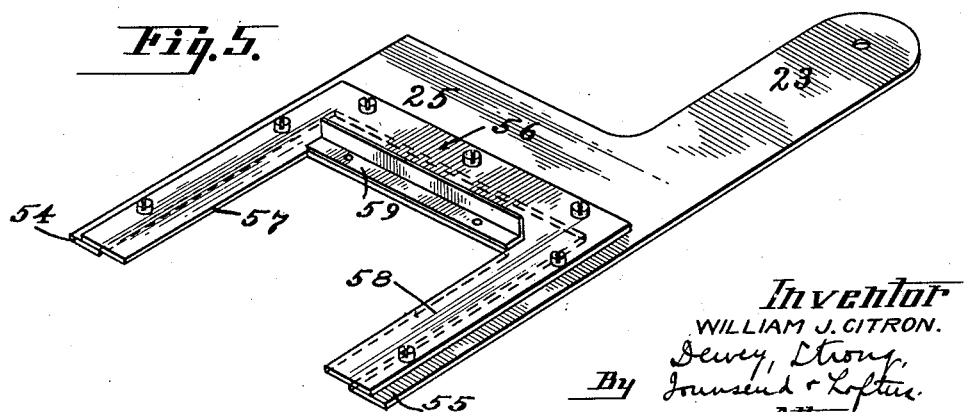
Inventor
WILLIAM J. CITRON.
By Dewey, Strong,
Townsend & Loftus.
Attys.

Patented Oct. 20, 1925.

1,558,145

UNITED STATES PATENT OFFICE.

WILLIAM J. CITRON, OF SAN FRANCISCO, CALIFORNIA, ASSIGNOR OF ONE-HALF TO LOUIS R. GREENFIELD, OF SAN FRANCISCO, CALIFORNIA.

FILM ATTACHMENT FOR STEREOPTICON PROJECTING MACHINES.

Application filed October 31, 1923. Serial No. 671,888.

*To all whom it may concern:*

Be it known that I, WILLIAM J. CITRON, a citizen of the United States, residing at the city and county of San Francisco and State of California, have invented new and useful Improvements in Film Attachments for Stereopticon Projecting Machines, of which the following is a specification.

This invention relates to the projection of still pictures, texts, announcements, etc., through the medium of continuous film.

In nearly all motion picture theatres, it is customary to project reading matter and still pictures for the purpose of announcing a future program or as an advertisement for local merchants. For this purpose a stereopticon projector is used which is slow and cumbersome on account of the time required to insert and remove the slides. Often the slides become broken, mixed up or disarranged, causing interruption in an extended announcement or series of pictures. Then too, there being no movement in the ordinary stereopticon projection, its effect is not as attractive as is to be desired. The advantage of having some movement or variation in connection with such announcements or advertisements has led exhibitors to resort to the use of motion pictures for this purpose. Obviously, however, the cost of making motion pictures for such purposes is prohibitive in most cases in view of the limited use thereof.

The object of my invention is to make possible the use of a movable and continuous film as a medium for projecting reading matter or still pictures through a stereopticon or like projector as a substitute for the usual glass slides.

The invention generally stated embodies an attachment or stereopticon or like projectors whereby still pictures, texts, announcements and the like carried upon a movable and continuous film may be projected upon a screen with provision for moving the film past the projecting aperture so as to impart motion to the projected image on the screen, and in conjunction therewith I provide an adjustable shutter mechanism whereby the size of aperture may be varied so as to project more or less of the subject-matter on any one section of the film in order to emphasize or accentuate some particular part thereof. Where the attachment is used in connection with a stereopticon projector, I make use of the second lamp to provide an adjustable and ornamental framing device for the projected image. The adjustable framing device is operated in synchronism with the adjustable shutters so that the border or frame will be varied to suit the size of the projected image. The film employed consists of a long strip of connected pictures, made either with a panoramic camera or an ordinary still camera. This film is wound and unwound like an ordinary motion picture film but, unlike the latter, it has no intermittent feed nor any revolving shutters used in connection therewith. The film may be held in stationary position as long as desired, or may be moved slowly and gradually across the aperture, thus bringing its contents upon the screen in continuous procession.

One form which my invention may assume is exemplified in the following description and illustrated in the accompanying drawings, in which—

Fig. 2 is a front view of the film attachment, the cooperating adjustable shutter, and the framing device.

Fig. 3 is a vertical longitudinal section taken on line 3—3, Fig. 2.

Fig. 4 is a perspective view of the frame projecting mechanism.

Fig. 5 is a perspective view of the upper shutter of the frame projecting mechanism.

Fig. 6 is a perspective view of the lower shutter employed in the frame projecting mechanism.

Fig. 7 shows a view of the image projected through the film without the use of the adjustable framing device.

Fig. 8 shows a similar view of the screen illustrating the effect of the adjustable framing device.

Figure 1:
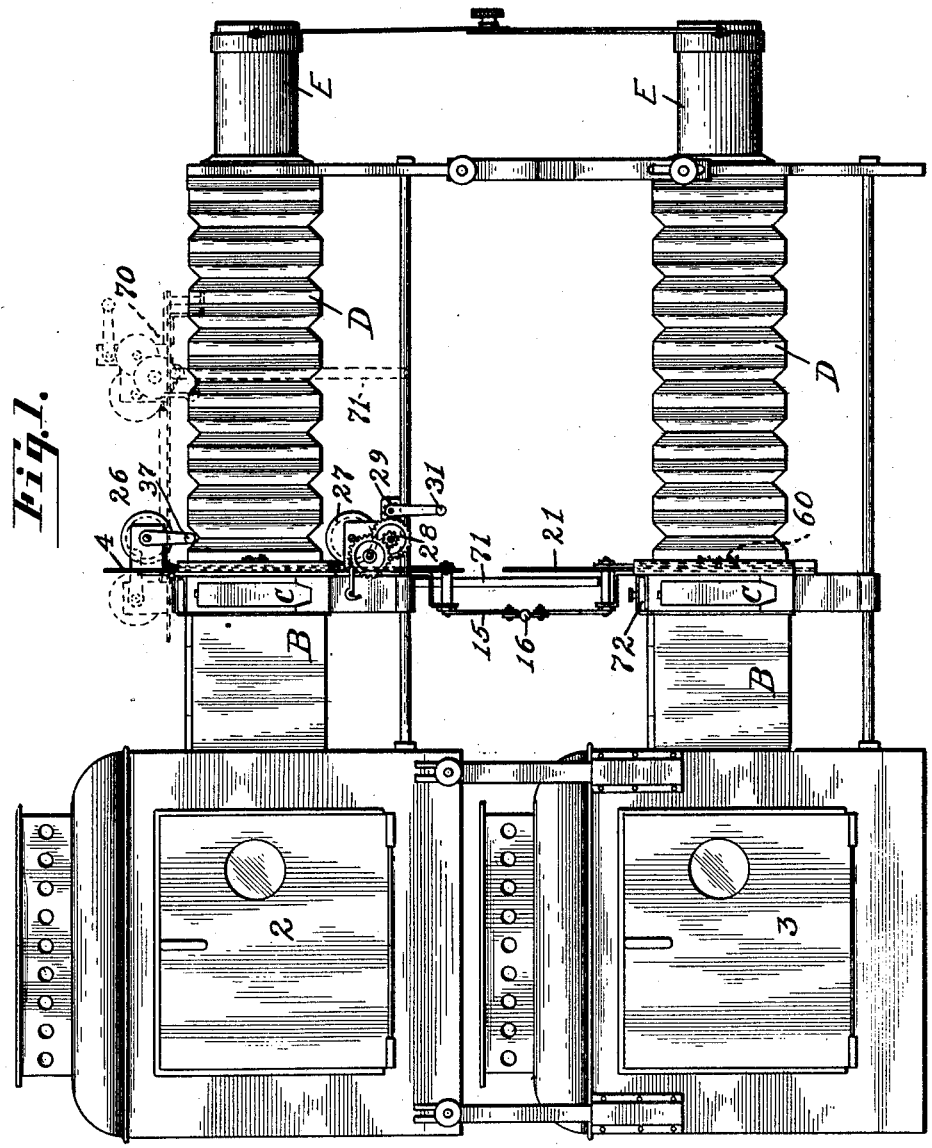
Fig. 1 is a side elevation of a stereopticon projecting machine showing the application of the invention.

Referring to the drawings in detail, and particularly to Fig. 1, A indicates a conventional type of stereopticon projecting machine which, as usual, is divided into two lamp houses such as indicated at 2 and 3. Disposed in front of each lamp house are a condenser housing B, slide carrier C, bellows D and projecting lens E.

The film attachment, forming the subject-matter of the present invention, is supported by the upper slide carrier B. The adjustable shutter cooperating therewith is similarly carried by the slide carrier B, while the frame projecting device is supported by the lower slide carrier indicated at C. The detail of construction of the entire mechanism is best illustrated in Figs. 2, 3, 4, 5 and 6, and reference will therefore be made to these figures.

The film attachment consists of a plate or frame such as indicated at 4; this frame being pivotally secured to the slide carrier B as indicated at 5. Formed on each side of the frame plate is a shutter guide 6, and disposed between the guides is a pair of shutter plates 7 and 8. Both of the plates are rectangular in shape and each plate is provided with a substantially square opening such as indicated at 9. The plates are adapted to be moved in opposition to each other and as such form an adjustable aperture through which the announcement, picture, etc., on the film may be projected.

To impart reverse movement to the shutter plates, a pair of extensions is formed on the respective plates as shown at 10 and 11. The frame 4 is similarly extended as shown at 12 and forms a pivotal support as shown at 13 for a lever 14. The opposite ends of this lever are pivotally attached to the extensions 10 and 11 and when rocking is imparted thereto, reverse movement will be transmitted to the shutter 6, thereby increasing or decreasing the size of the aperture through which the picture is projected.

These shutter plates are effective to vary the height of the aperture. In order to vary the width of the aperture, use may be made of the slide carrier, indicated at C, using any convenient form of opaque plate as a slide.

For the purpose of imparting movement to the lever 14, a slide bar 15 is employed. This is provided with a handle 16, whereby it is actuated, and the upper end of the slide bar is connected to a crank arm 17 which in turn is secured to a shaft or the like indicated at 13, which supports the lever 14. By moving the slide bar 15 in one direction, the shutter aperture is decreased in size and, conversely, by moving it in the opposite direction, the size of the aperture is increased. The slide bar 15 is extended as shown in Fig. 2 and its lower end is pivotally connected with a second crank arm 18 which is connected with a lever arm 19. This is in turn pivotally supported by an extension 20 formed on a frame plate 21, and the opposite ends of the lever 19 are pivotally attached to a pair of extensions 22 and 23, similar to those indicated at 10 and 11. The extensions 22 and 23 are connected with slidable plates 24 and 25 which cover the aperture in the lower projector and form a part of the adjustable or compensating frame for the image projected by the upper lamp.

The film attachment is supported by the upper frame plate 4 and it consists of a pair of spools such as shown at 26 and 27. The upper spool serves as a receiving spool, while the lower spool indicated at 25 serves the function of a winding spool. This spool is turned at a relatively slow speed through means of a reduction gear train such as shown at 28, which in turn is rotated by means of a pinion 29 secured on the shaft 30, which is rotated by means of a hand crank 31. The use of reduction gearing in this connection is of great importance. 1 show three sets of reducing gears between the crank and the spool, each set affording a reduction of approximately 2½ to 1 and giving a cumulative reduction of approximately 40 to 1 between the crank and spool. Therefore, the operator can continuously operate the crank at a convenient speed, and on account of the gear reduction between the crank and spool the film will move exceedingly slow across the aperture, thus allowing sufficient time for the spectator to read and observe the projected images on the screen, and, furthermore, the film will not respond perceptibly to any slight variations or irregularities in the turning of the crank. The film is maintained in snug engagement with the shutter plates 7 and 8 by means of a gate 32, this gate being hingedly supported at the points indicated at 33 and being locked when in position by means of a latch 34. The hinging of the gate is merely a matter of convenience as it permits the film to be readily passed from one spool to another when inserting the same, and to be held snugly in engagement with the shutters when in operation.

The receiving spool is provided with the usual friction device to maintain the film in proper tension. This friction device comprises a collar 35 mounted on the shaft 36 of the spool, which is rotated by means of a hand crank 37 and a disk 38 splined to the shaft and frictionally engaging the collar 35 through means of a spring 39, the crank 37 being only employed when the film is to be re-wound and removed. The winding spool 27 is in that instance released by sliding the gear 40 out of mesh with the remaining gear train so as to permit the spool 27 to freely rotate. It will be noted that the gear 40 is secured in position on the shaft by means of a nut 41; therefore, if the nut is removed, gear 40 may be moved longitudinally on the shaft out of mesh with the remaining gears, thus leaving the spool 27 free to rotate; this operation being only resorted to when it is desired to quickly rewind the film on spool 26.

Referring now to the adjustable framing device, the plate indicated at 25 will be referred to as the upper shutter and the plate 24 as the lower shutter. These shutters are perhaps best illustrated in Figs. 4, 5 and 6; Fig. 5 illustrating the upper shutter and Fig. 6, the lower shutter. The lower shutter consists of a metal plate in which is formed a rectangular-shaped opening 50. Secured to the lower edge of the shutter, by means of rivets or the like as indicated at 51, is a transparent plate 52 which may be constructed of glass, celluloid or a like material, and secured to the upper edge of the transparent plate is an angle bracket 53. The upper plate is also constructed of metal and has two extended legs formed on its lower end such as indicated at 54 and 55. A transparent plate 56 is secured to the plate 25 and this plate is also provided with two extending legs as indicated at 57 and 58. The plate 56 furthermore carries an angle bracket such as shown at 59 and this, together with the angle bracket 53 previously referred to, supports a foldable diaphragm such as indicated at 60. The diaphragm 60 is constructed of a non-transparent material such as black silk or the like and no light is thus to be projected therethrough. Light will, however, be projected through the transparent plates 52 and 56 and the light thus projected is employed for the purpose of framing the announcement which is projected through the upper shutter. Any type of border may be projected, for instance, colored or otherwise, and practically any ornamental design may be employed as the border is painted or photographed in colors on the plates 52 and 56, an outline of a frame being indicated at 61. For the manufacture of the transparent plates 52 and 56, I may employ a sensitized glass plate and photograph the desired border thereon. Thereafter the plate can be cut into the shape of a U to form the plate 56 with legs 57 and 58, the part cut out therefrom being recut to form the plate 52.

The shutters 24 and 25 work in unison with the shutters 7 and 8 and, as this is the case, when the aperture produced by the shutters 7 and 8 is small, the frame projected by the lower shutters will also be small, and as the upper aperture is enlarged the frame is enlarged correspondingly.

In the practice of this invention a series of still pictures, announcements, texts, etc., are photographed on a strip of film by means of a still camera or a panoramic camera. A number of such strips of film may be pasted together to form a reel of the required length. This reel is inserted in the attachment and the free end of the film is connected with the winding spool. Movement of the latter will carry the film past the aperture in front of the lamp house and any size opening may be formed by manipulation of the adjustable shutters. Thus, if one line only of the announcement is to be featured, the shutters are moved close together, while if the full area of the screen is to be utilized then the shutters are moved apart, thus displaying several lines. It is apparent that by using a continuous and movable film the announcement or text can be unravelled slowly upon the screen without interruption and the images of the words, symbols or pictures can be brought upon the screen in continuous procession, thereby attracting greater attention than would an ordinary still projection such as the usual stereopticon produces.

It will be understood that the lower projecting lens is focused on the same area as the upper projecting lens so that the frame or border on the lower projector will surround the matter projected through the upper lens. Inasmuch as the adjustable framing device is connected to the adjustable shutters of the upper projector, it is obvious that the size of the frame or border will be varied in accordance with the size of the projected matter. In some cases I may omit the adjustable framing device and employ but one unit of the projector or perhaps use the film attachment in connection with a magic lantern. However, the framing device gives a more attractive effect and breaks up the straight lines that otherwise would surround the image. This is illustrated in the drawings where the projected image, without the border or ornamental frame, is shown in Fig. 7, and in Fig. 8 where it is shown with the ornamental frame or border.

It was previously stated that the film attachment was pivotally supported with relation to the upper slide carrier B as indicated at 5. While this is not essential it may be of advantage in some instances as it permits the frame plate 4, together with the mechanism supported thereby, to be swung up into the horizontal position indicated by dotted lines at 7. (See Fig. 1.) This is accomplished by first disconnecting the slide bar 15 with relation to the lever 17 and then raising the frame plate B and securing it in its horizontal position by means of a leg such as shown at 71; that is, the use of ordinary slide plates may be required from time to time and it is for this reason that the frame 4 is pivotally supported so that it may be swung out of the way of the slide carrier B to permit the use thereof. The lower frame plate 21 is secured to the slide carrier C by means of an upper clamp such as indicated at 72. This may therefore also be removed when desired, thus permitting the stereopticon projector to be used in the ordinary manner. Where the film attachment, the adjustable shutter and the framing device, are installed for permanent use, it is obvious that the slide carriers B and C may be entirely removed.

While certain features of the present invention are more or less specifically illustrated, I wish it understood that various changes in form and proportion may be resorted to within the scope of the appended claims. I similarly wish it understood that the materials and finish of the several parts employed may be such as the experience and judgment of the manufacturer may dictate or various uses may demand.

While I have used the term "film" throughout the specification and claims, it is to be understood that the use of elements other than a film may be employed by which announcements, figures or pictures may be projected on the screen with practically the same results. For instance, the use of a roll or strip of a prepared element such as transparent paper on which the text is written with a pen, pencil or is typewritten, or an opaque element may be employed on which a transparent text is scratched giving a white projection on a dark screen. The use of gelatine, which is at present employed as a substitute for glass slides in producing quick announcements, such as election returns, etc., may be employed, or prepared paper or silk or other cloth either in a transparent or an opaque condition may be employed.

Having thus described my invention, what I claim and desire to secure by Letters Patent is—

1. An attachment for light projectors having a slide carrier, comprising means hingedly mounted in front of the slide carrier to receive and support a flexible film in position across the aperture therein, and means for operating said film, said operating means, film and support being adapted to be swung away from the slide carrier to permit the latter to be used in the ordinary way.

2. The combination with a projecting machine, of an attachment therefor including winding and unwinding spools to support a flexible film in position across the projection aperture, manually operated means for actuating the winding spool, said manually operated means including reduction gearing affording approximately forty to one reduction or greater, and means for disconnecting said gearing to permit the winding spool to be unwound.

3. The combination with a projecting machine, of an attachment therefor, comprising shutter members movable toward and from each other in position to vary the size of the projecting aperture, a hinged member forming in conjunction with the shutter members means to receive and guide a film movably across the aperture, and means for simultaneously moving the shutter members in opposite directions.

4. The combination with a projecting machine, of an attachment therefor comprising winding and unwinding spools to receive and support a flexible film in position across the aperture in the projecting machine, manually operated means for imparting motion at greatly reduced speed of travel to the film whereby reading matter, announcements and the like contained on the film may be projected upon a screen in continuous motion but sufficiently slow to enable the spectators to read the same or may be held stationary at the will of the operator, oppositely movable shutters for varying the size of the aperture in the projecting machine and unitary means adjacent the film operating means for controlling said shutters whereby the area of the projected matter may be varied during the operation of the film.

5. An attachment for light projectors having a slide carrier, comprising a frame arranged in front of the slide carrier, winding and unwinding spools to receive and support a flexible film carried by said frame, a pair of shutter members adjustable toward and from each other also carried by said frame in position to control the aperture in the projector, and a hinged mounting for the frame, whereby it and the connected parts may be swung away from the slide carrier to permit the latter to be used in the normal way.

6. An attachment for light projectors having a slide carrier, comprising a frame arranged in front of the slide carrier, winding and unwinding spools having a flexible film mounted on said frame, and manually operated means for continuously and slowly actuating the film arranged on the said frame, and a hinged mounting for the frame, whereby it and the connected parts may be swung away from the slide carrier.

7. The combination with a light projector, including a lamp house, condensing system and slide carrier, of an attachment positioned in front of the slide carrier and consisting of a frame, winding and unwinding spools to receive and support a film, shutter members movable toward and from each other in a vertical direction to vary the height of the aperture in the projector, means received in the slide carrier to vary the width of said aperture, and means for moving the film across said aperture.

8. The combination with a stereopticon projecting machine, of an attachment therefor adapted to receive and support a film, said film having an announcement, text, etc., printed, photographed or otherwise formed thereon, a shutter having an aperture formed therein and through which the announcement is projected, means for increasing or decreasing the size of the aperture so as to display any portion of the announcement or all thereof, a frame projecting device co-operating with the shutter and adapted to project a frame to surround the announcement, and means for adjusting the size of the frame projecting device in unison with the shutter.

9. The combination with a double stereopticon, of an attachment therefor, comprising a film support and operating mechanism therefor for cooperation with one unit of the stereopticon, shutter members movable toward and from each other to vary the size of the projecting aperture across which the film passes, a border or frame projecting device for cooperation with the other unit of the stereopticon and consisting of a pair of plates slidable towards and from each other, and means for adjusting the shutter members and plates in unison.

10. In a device of the character described, a frame projecting device, and means permitting adjustment of the same to increase or decrease the size of the frame projected, said device comprising a pair of sliding plates, transparent portions formed on each plate, and a non-transparent diaphragm connecting the plates.

11. In a device of the character described, a frame projecting device, means permitting adjustment of the same to increase or decrease the size of the frame projected, said device comprising a pair of sliding plates, transparent portions formed on each plate, a non-transparent diaphragm connecting the plates, and means for imparting movement to the plates in opposition to each other.

12. In an attachment of the character described, a film having a series of successive images printed thereon, a shutter cooperating with the film and having an adjustable orifice through which the images are projected on the screen and by the adjustment of which any portion or all of the image may be blocked out, separate means for projecting a frame on to the screen to surround the image, and means for increasing or decreasing the size of the frame projecting means in unison with the adjustment of the shutter orifice.

WILLIAM J. CITRON.